(12) United States Patent
Mizuno et al.

(10) Patent No.: US 7,062,621 B2
(45) Date of Patent: Jun. 13, 2006

(54) STORAGE SYSTEM AND METHOD FOR BACKUP

(75) Inventors: Yoichi Mizuno, Yokohama (JP); Naoto Matsunami, Hayama (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 10/894,295

(22) Filed: Jul. 20, 2004

(65) Prior Publication Data

US 2005/0086445 A1 Apr. 21, 2005

Related U.S. Application Data

(63) Continuation of application No. 10/781,685, filed on Feb. 20, 2004.

(30) Foreign Application Priority Data

Oct. 20, 2003 (JP) .............................. 2003-359254

(51) Int. Cl.
*G06F 12/16* (2006.01)
(52) U.S. Cl. ............................. 711/162; 707/204; 714/6
(58) Field of Classification Search ...................... None
See application file for complete search history.

(56) References Cited

U.S. PATENT DOCUMENTS

| | | | | |
|---|---|---|---|---|
| 5,522,037 A | * | 5/1996 | Kitagawa et al. ............. | 714/40 |
| 5,625,820 A | | 4/1997 | Hermsmeier et al. | |
| 5,758,359 A | | 5/1998 | Saxon | |
| 5,822,780 A | * | 10/1998 | Schutzman ................. | 711/165 |
| 6,353,878 B1 | * | 3/2002 | Dunham ...................... | 711/162 |
| 6,366,987 B1 | * | 4/2002 | Tzelnic et al. ............... | 711/162 |
| 6,397,308 B1 | * | 5/2002 | Ofek et al. .................. | 711/162 |
| 6,549,973 B1 | | 4/2003 | Kibashi et al. | |
| 2003/0084372 A1 | | 5/2003 | Mock et al. | |
| 2004/0030852 A1 | | 2/2004 | Coombs et al. | |
| 2004/0078628 A1 | * | 4/2004 | Akamatu et al. .............. | 714/4 |
| 2004/0148485 A1 | | 7/2004 | Suzuki | |
| 2004/0260965 A1 | | 12/2004 | Kelman | |
| 2005/0028025 A1 | | 2/2005 | Zalewski et al. | |
| 2005/0055444 A1 | | 3/2005 | Venkatasubramanian | |
| 2005/0071390 A1 | * | 3/2005 | Midgley et al. ............ | 707/204 |
| 2005/0081006 A1 | * | 4/2005 | Shackelford et al. ....... | 711/162 |

FOREIGN PATENT DOCUMENTS

JP 07084728 3/1995

* cited by examiner

*Primary Examiner*—Reginald G. Bragdon
*Assistant Examiner*—Daniel Ko
(74) *Attorney, Agent, or Firm*—Mattingly Stanger Malur & Brundidge, P.C.

(57) ABSTRACT

A storage system which comprises a disk controller and a disk device having original volumes for backup and a storage pool for backup data. It incorporates a differential management program which checks whether the original volumes for backup are updated or not; a pool management program which allocates a disk area to the storage pool for backup data; a performance management program which manages the performance of each volume; and a backup control program which performs total backup control. A backup method by which recovery within a user-specified recovery object time is possible is selected according to the restore performance calculated by the performance management program and the total size of changed blocks after backup acquisition as counted by the differential management program.

7 Claims, 11 Drawing Sheets

USER SETUP SCREEN (example)

Recovery Point Object
- ○ Time [ ]
- ● Hour [PM12:00]  No. of Generations [7]
- ○ Total Size of Changed Blocks [ ]

Recovery Time Object

0　1　2　3　····
Time [30 mins.]

FIG.3

Performance Management Program — 114

Performance Management Table — 1141

| Internal LUN | 0 | 1 | ···· |
|---|---|---|---|
| RAID Configuration | 2D+1P | 3D+2P | ···· |
| Disk Type | FC | ATA | ···· |
| Disk Capacity | 144GB | 180GB | ···· |
| Read Performance | 50M | 30M | ···· |
| Write Performance | 70M | 30M | ···· |
| ⋮ | ⋮ | ⋮ | |
| | | | |

STORAGE SYSTEM AND METHOD FOR BACKUP

The present application is a continuation of application Ser. No. 10/781,685, filed Feb. 20, 2004, the contents of which are incorporated herein by reference.

BACKGROUND OF THE INVENTION

The present invention relates to a storage system and, more particularly, to a storage system configuration and a backup acquisition method based on the storage system.

Generally, if data recorded in a storage system is lost due to a hardware problem in the storage system, defective software, an erroneous operation or for some other reason, it is necessary to carry out a dump process in which data is periodically copied and stored in a backup medium for restoration of lost data, namely a backup operation is performed.

In a conventional storage system, backup software is installed in a backup server, and a user operates this backup software to issue an instruction to start the backup process. As an instruction to start the backup process is issued, the backup server reads data to be backed up (original data for backup) from the storage system and records it in a tape device. If the original volume for backup in the storage system becomes unusable due to a system problem or for some other reason, the backup data recorded in the tape device is read out so as to restore the data in a volume in the storage system, thereby to recover the condition before occurrence of the problem.

There are generally three types of backup methods: full backup where a whole volume (data) is backed up; differential backup where, with an acquired full backup as a base, a part which is not changed (updated) is not backed up and a part which is changed is backed up; and incremental backup where only a part which is changed after the time point of the previous backup, whether it is full backup or differential backup, is backed up.

In the full backup method, a whole volume is copied, and thus the volume obtained by restoration of the acquired data is complete.

In the differential backup method, it is necessary to restore full backup data first and then copy differential data acquired as changed (update) data onto the full backup to recover the data which existed at the time of backup acquisition. In the incremental backup method, it is necessary to restore full backup data first as in the differential backup method, and then copy all generations of acquired update data repeatedly.

In the differential backup method, a full backup is used as a base for data acquisition, so it is only necessary to make one copy of the full backup; on the other hand, in the incremental backup method, a backup of changes from the last acquired backup is repeated, and thus all generations of acquired differential data must be copied repeatedly. Therefore, as the number of generations or changed data blocks increases, the time required for restoration increases. The data restoration processes in the full backup, differential backup, and incremental backup methods may be applied in the present invention.

One example of a conventional technique for the backup of large volumes of data is as follows: full backup and differential backup (backup of changes after the full backup) are combined to reduce recovery processing time after backup acquisition (see JP-A No. 84728/1995). JP-A No. 84728/1995 discloses a system where either differential backup or full backup is chosen depending on the volume of update data.

Since the speed of making a backup using a tape device is low, backup takes a longer time as larger volumes of data must be handled. Besides, backup software is needed to perform backup to the disk device, and with some types or versions of an OS or some backup software currently in use, it may not be possible to perform the backup process.

The most important parameters for the backup process are Recovery Point Object and Recovery Time Object: Recovery Point Object specifies a time point up to which data should be traced back and recovered, and Recovery Time Object specifies how much time should be taken to restore data. Specific means to achieve these objects have not been provided heretofore.

The problems encountered heretofore are as follows. The user has to construct a backup system, taking into consideration the following factors: the details of a complicated storage volume structure, the performance and access frequency and so on.

In addition, because the access frequency and total size of the changed blocks, which largely vary during an operation, are difficult to predict, it is impossible to optimize the backup process. In some cases, the total size of the changed blocks is more than expected and the recovery time is much longer than expected. Furthermore, the user has to consider the complicated backup system configuration and do various troublesome tasks: selection of the backup method, backup destination capacity management, backup scheduling and so on.

According to JP-A No. 84728/1995, the amount of present update data is detected and the backup method is chosen depending on whether the amount is larger or smaller than a reference value. In this approach toward backup method selection, the recovery processing time is not taken into consideration. Although JP-A No. 84728/1995 mentions reduction in recovery processing time, this simply implies that the reading time is shortened by automatic elimination of unnecessary backup destination media.

SUMMARY OF THE INVENTION

In order to solve the above-mentioned problems, the present invention provides a storage system which performs backup to a high speed disk device for large volumes of data and allows easy acquisition of a practical backup, minimizing the burden on the user, and a backup method thereof.

According to one aspect of the present invention, a storage system is configured as follows.

A storage system comprises a disk controller which has a CPU, a main memory, and an interface, and a disk device which has original volumes for backup and a storage pool for backup data.

The main memory incorporates: a differential management program which checks whether the original volumes for backup are updated or not; a pool management program which allocates a disk area for storage of backup data to the storage pool for backup data; a performance management program which manages the performance of each volume of the disk device; and a backup control program which issues an instruction to the differential management program, the pool management program, and the performance management program for total backup control.

The backup control program selects a backup method by which recovery within a user-specified recovery object time is possible, according to the restore performance calculated by the performance management program and the total size of changed blocks after backup acquisition as counted by the differential management program.

According to another aspect of the invention, a storage system may be configured as follows.

A storage system comprises a disk controller which has a CPU, a main memory, and an interface; and a disk device which has original volumes for backup.

The storage system is connected through a data transfer line with a backup storage system which has a volume for storage of backup data serving as a backup destination.

The main memory incorporates: a differential management program which checks whether the original volumes for backup are updated or not; a performance management program which manages the performance of each volume of the disk device; a data transfer program which transfers data between the storage system and the backup storage system; a backup destination management program which manages the backup volume for backup data; and a backup control program which issues an instruction to the differential management program, the performance management program, the data transfer program, and the backup destination management program for total backup control.

The backup control program selects a backup method by which recovery within a user-specified recovery object time is possible, according to the restore performance calculated by the performance management program and the total size of changed blocks after backup acquisition as counted by the differential management program.

According to another aspect of the invention, a storage system may be configured as follows.

A storage system comprises a disk controller which has a CPU, a main memory, and an interface; and a disk device which has original volumes for backup. The storage system is connected through a data transfer line with a backup storage system which has a storage volume for backup data serving as a backup destination, and it is also connected with a backup server which has backup software to manage backup data on a file-by-file basis and a backup setup program.

The main memory incorporates: a differential management program which checks whether the original volumes for backup are updated or not; a performance management program which manages the performance of each volume of the disk device; a data transfer program which transfers data between the storage system and the backup storage system; a backup destination management program which manages the storage volume for backup data; and a backup control program which issues an instruction to the differential management program, the performance management program, the data transfer program, and the backup destination management program for total backup control. The backup control program selects a backup method by which it is possible to recover data within a recovery object time specified on a setup screen under the backup setup program of the backup server, according to the restore performance calculated by the performance management program and the total size of changed blocks after backup acquisition as counted by the differential management program.

According to another aspect of the invention, a backup method may comprise the steps described below.

For example, the backup method is used in a storage system which comprises a disk controller which has a CPU, a main memory, and an interface; and a disk device which has original volumes for backup and a storage pool for backup data. Here, the main memory incorporates: a differential management program which checks whether the original volumes for backup are updated or not; a pool management program which allocates a disk area for storage of backup data to the storage pool for backup data; a performance management program which manages the performance of each volume of the disk device; and a backup control program which issues an instruction to the differential management program, the pool management program, and the performance management program for total backup control.

The method comprises the steps of: the differential management program counting the total size of changed blocks after the previous backup acquisition; the performance management program calculating estimated restore time for backup by reading the write performance and the read performance and taking the lower performance as an estimated restore performance and dividing the total size of the changed blocks by the estimated restore performance; deciding whether the calculated estimated restore time is within a user-specified recovery object time or not; and selecting a backup method by which recovery within the object time is possible.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, preferred embodiments of the present invention will be described in detail; however, it should be understood that the present invention is not limited to these embodiments.

Embodiment 1

Figure 1:
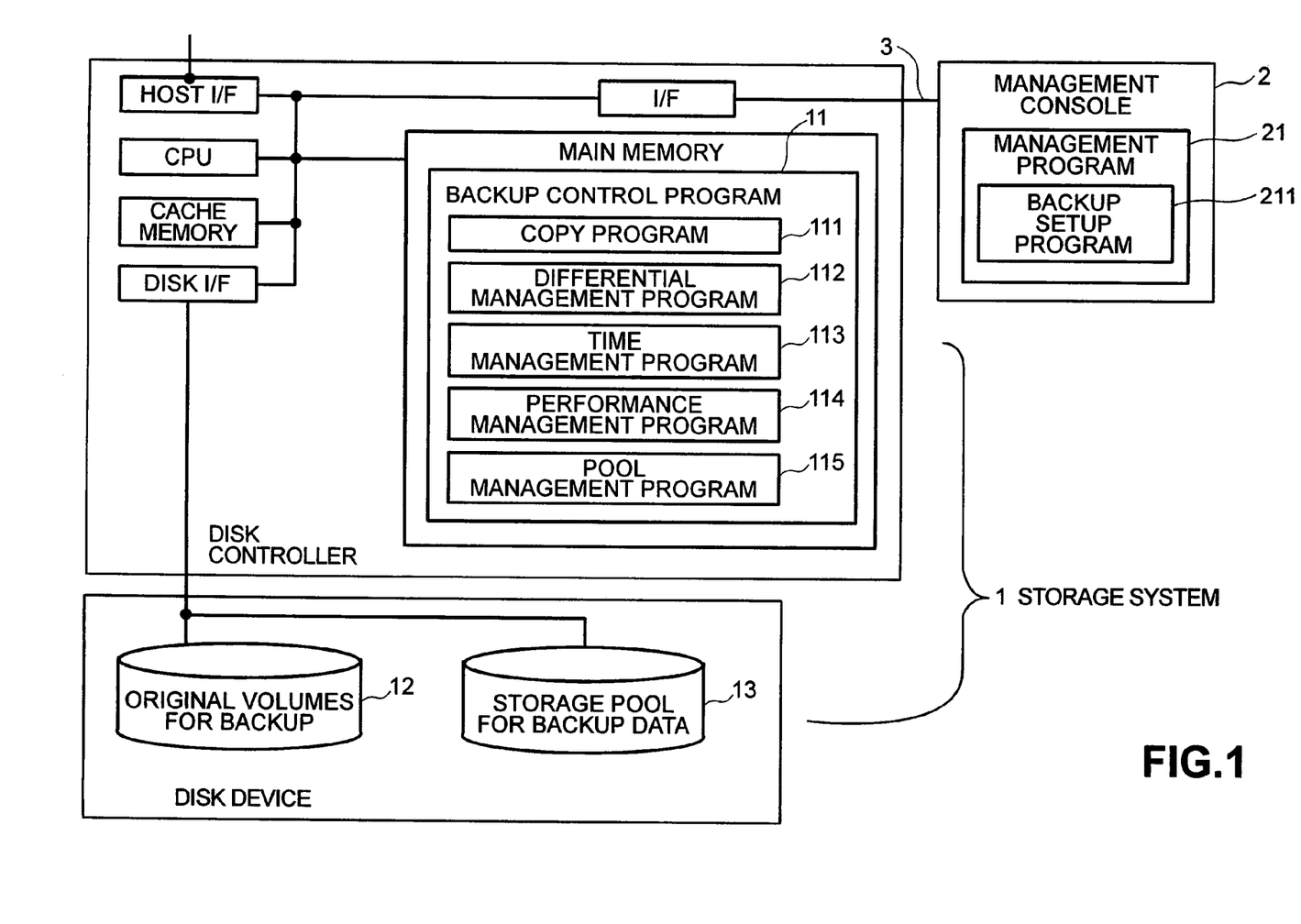
FIG. 1 is a block diagram showing a storage system and a management console according to a first embodiment of the present invention.

FIG. 1 shows the system configuration of a first embodiment of the present invention, in which the system includes a storage system 1, a management console 2 which manages the storage system, and a communication line 3 which connects the storage system 1 and the management console 2.

The storage system 1 consists of a disk controller and a disk device. The disk controller has interfaces with external devices, a CPU, a cache memory and, a main memory; and the disk device has original volumes for backup 12 and a storage pool for backup data 13. The main memory of the storage system 1 incorporates a backup control program 11. The backup control program 11 selects and executes a backup method according to given information so as to perform total backup control for the storage system 1. The storage pool for backup data 13 stores data acquired as a backup from the original volumes for backup 12. An original volume for backup 12 and a volume in the storage pool for backup data 13 each consist of one or more physical disks.

Under the backup control program (or backup control module) 11, there are various programs: a copy program 111 which duplicates or copies data in the storage system 1; a differential management program 112 which checks whether the original volumes for backup are updated or not; a time management program 113 which manages the backup start time and backup/restore time; a performance management program 114 which manages the performance of each volume; and a pool management program 115 which manages volume or area allocation to the storage pool for backup data 13. The backup control program 11 gives these programs an instruction in order to perform total backup control.

The management console 2 incorporates a management program 21 which makes various settings on the storage system 1 and a backup setup program 211 which makes settings for backup. In this embodiment, the backup setup program 211 is installed in the management console 2. However, it may be installed in the storage system 1 or in a host which accesses the storage system 1.

Figure 2:
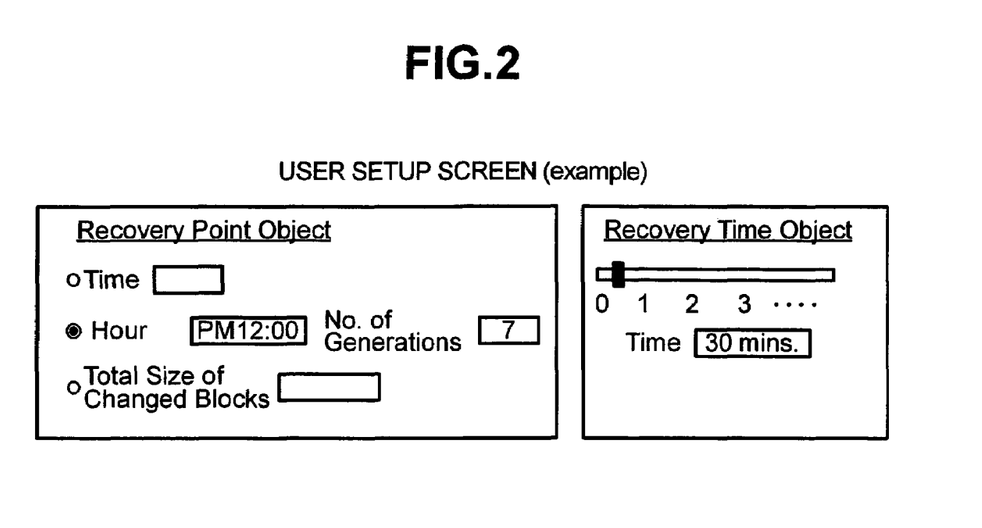
FIG. 2 is a diagram which shows an example of a user setup screen which appears under a backup setup program in a management console connected with the storage system according to the first embodiment.

FIG. 2 shows an example of a user setup screen under the backup setup program 211. The backup setup program 211 is operated by a user on the management console 2.

On the setup screen shown in FIG. 2, a Recovery Point Object and a Recovery Time Object can be specified. In this case, three parameter options are available for the Recovery Point Object: Time, Hour, and Total Size of Changed Blocks. If an original volume becomes unusable due to some problem or the like, the Recovery Point Object indicates up to which point data should be traced back and restored.

Concretely, the "Time" parameter for the Recovery Point Object specifies up to which time point data should be traced back and restored (data restoration using backup data); here the user can enter a time duration which is within a permissible range for system operation. The "Hour" parameter for the Recovery Point Object specifies a time point (hour) at which data is to be restored; a backup is acquired at the specified time (hour). This parameter is useful when a backup is to be acquired at a predetermined time everyday. The user can enter a time at which he/she wishes to acquire a backup. In the example shown in FIG. 2, the content of a volume is backed up at 12:00 p.m. everyday. The "Total Size of Changed Blocks" parameter for the Recovery Point Object specifies how much data should be updated (changed) before each backup acquisition. The user can enter a data loss size which is within a permissible range for system operation. The "Number of generations" parameter for the Recovery Point Object specifies the number of generations of data which are to be backed up. This parameter is used to acquire more than one generation of backup data. In the example shown in FIG. 2, seven generations of backup data are stored for one original volume.

The "Time" parameter for the Recovery Time Object indicates that if an original volume becomes inaccessible because of a problem or for some other reason, a time period specified here is required to restore the data concerned, or before the volume becomes accessible.

This setup should be made for each original volume for backup. Several volumes may be treated as a group to create a setup for the group collectively. The user can create a backup setup by simple entry work. According to this embodiment, backup parameters and options are not limited to those shown on the setup screen (FIG. 2), and the user can use parameters for either the Recovery Point Object or the Recovery Time Object or both, according to user requirements.

Figure 3:
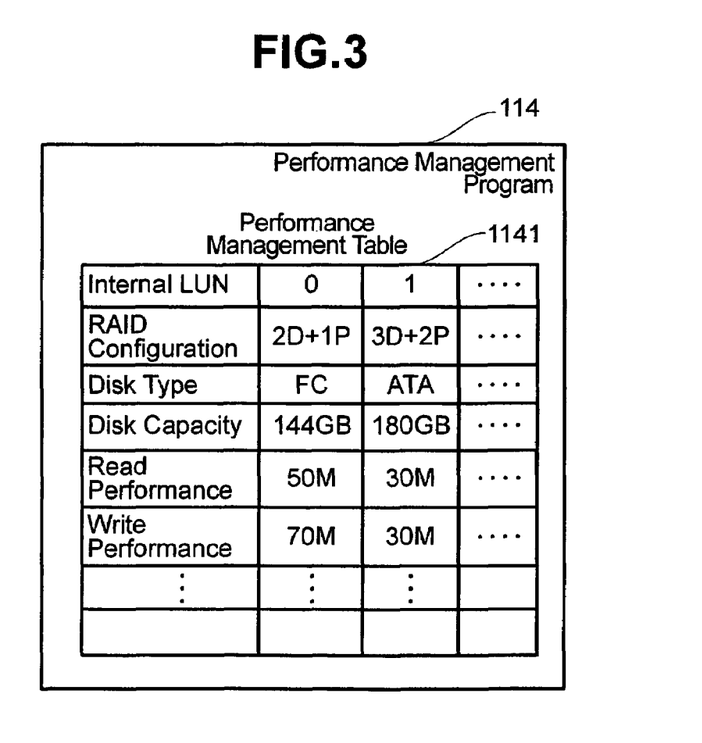
FIG. 3 is a diagram which shows a performance management program which manages the performance of volumes in the storage system according to the first embodiment.

FIG. 3 shows an example of the performance management program 114. A performance management table 1141 is used to manage disk performance and volume performance and to calculate the restore performance for data restoration. The performance management table 1141 contains volume performance information for each LUN (Logical Unit No) as an internal volume ID: RAID Configuration which constitutes a volume, disk type, disk capacity, read performance, write performance and so on. The performance management program 114 calculates the volume restore performance from the RAID Configuration, disk performance information and so on. For the above information, all available patterns for each configuration may be stored in advance, or the actual performance information may be collected by performance monitoring in the storage system 1.

In the table of FIG. 3, "2D+1P" in the RAID Configuration row represents two data drives and one parity drive; and "FC" and "ATA" in the Disk Type row respectively represent the Fiber Channel disk type and the AT Attachment disk type.

Figure 4:
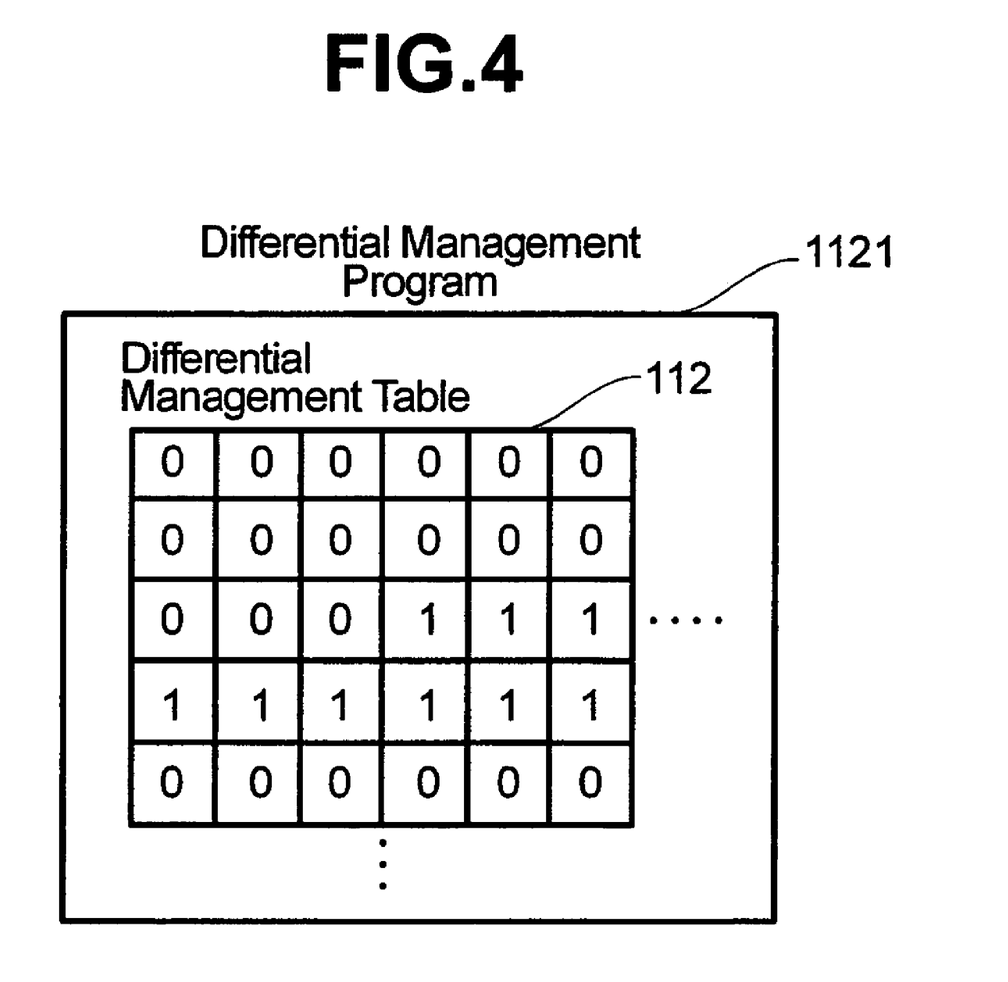
FIG. 4 is a diagram which shows a differential management program which checks whether original volumes for backup are updated or not, in the storage system according to the first embodiment.

FIG. 4 shows an example of the differential management program 112. Numeral 1121 represents a differential management table which is used to check whether the original volumes 12 for backup are updated or not. More specifically, a bitmap is used to check whether the original volumes for backup 12 are updated. The bitmap granularity is set to a predetermined data size (for example, stripe size) to hold bits equivalent to the volume capacity. The initial value of each bit is 0 (zero), and when a change is made after a specific point of time, it is set to 1. This means that when there is a change in an original area, the bit is 1, and when there is no change, it is 0. In this embodiment, a plurality of differential management tables are prepared for one original volume to cope with different reference values. Although the differential management table 1121 shown here uses a bitmap for description, it may be a list of changed blocks, or it may use another description method which uses a pointer or the like, without departing from the scope of the present invention.

Figure 5:
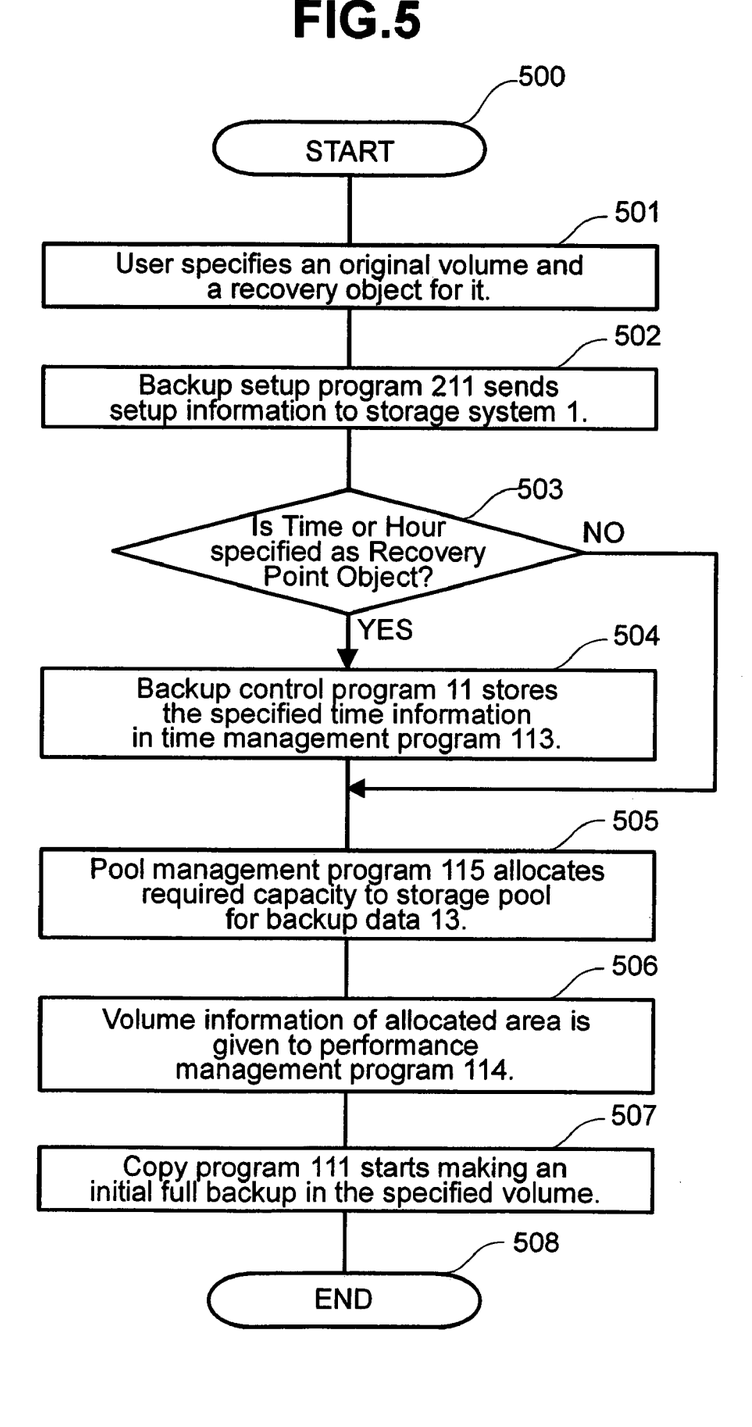
FIG. 5 is a flowchart which shows a backup initial setup process according to the first embodiment.

FIG. 5 is a flowchart of a backup initial setup process according to the first embodiment. First, the user specifies an original volume for backup and a recovery object for it. As the recovery object, either the Recovery Point Object or the Recovery Time Object, or both, is specified, as shown in FIG. 2. The user also selects one from among the unused disks in the storage system 1 as a disk for storage of backup data and registers it as a storage pool for backup data. When the free capacity decreases and becomes insufficient during system operation, a disk may be added to the storage pool for backup data to increase the pool capacity (step 501).

The backup setup program 211 sends the setup information to the storage system 1 through the communication line 3 (step 502). The backup control program 11, which has received the setup information, checks whether a Time or Hour is specified as the Recovery Point Object. If a Time or Hour is specified, the system goes to step 504; if not, it goes to step 505. For example, if the Total Size of Changed Blocks is specified as the Recovery Point Object, the system goes to step 505 because a Time and Hour are not specified (step 503).

The backup control program 11 stores the specified time information in the time management program 113. More specifically, when a Time is specified as the Recovery Point Object, the backup acquisition time interval is set to the specified time interval. When an hour is specified, the system is set so as to acquire a backup of data at the specified time (hour). The time management program 113 manages the system internal time and time information. When the time to acquire a backup comes, the backup control program 11 is notified (step 504).

The pool management program 115 allocates an area necessary for backup of the original volume 12 to the storage pool for backup data 13. The pool management program 115 manages the disk registered for backup data storage as the storage pool for backup data 13 and allocates an area as needed to create an internal volume. Since an initial backup should be a full backup representing a copy of the whole volume, a volume with the same capacity as the original volume for backup 12 is prepared (step 505).

The performance management program 114 receives volume information, such as the RAID configuration and disk type of the allocated area. The performance management program 114 writes the received information in the performance management table 1141 so as to manage the allocated volume performance (step 506).

Once the required capacity has been obtained, the backup control program 11 first specifies a copy source volume and a copy destination volume for the copy program 111 in order to acquire a full backup as a base, and it issues an instruction to make an initial copy. Here, the original volume for backup 12 is as a copy source volume and the volume newly created at step 505 is a copy destination volume. The copy program 111 makes an initial copy in the specified volume.

Generally, full backup takes a lot of time because it is necessary to copy the whole volume. Therefore, in this embodiment, copying is not started at the specified time to acquire a backup, but a full backup is achieved by duplicating the volume during initial copying beforehand and thereafter splitting the two volumes at a certain time point. A change which is made during initial copying is written in each of the two volumes, and access to the original volume for backup 12 can be continued even during backup acquisition. The time to split the volumes is indicated by the time management program 113. The method of full backup acquisition is not limited thereto (step 507).

Initial setup is completed in this way, and the first generation of a full backup as a base is acquired. As a preparation for the next full backup, when the first generation of a full backup is acquired, the volume is duplicated in the same manner as at step 507 so as to shorten the copying time for acquisition of the next full backup. It is also acceptable to make three or more copies of the volume when the first generation of a full backup is acquired.

The time to start backup is indicated by the time management program 113 as mentioned above. When the Total Size of Changed Blocks is specified as the Recovery Point Object, a time is not specified at step 504, and thus the time management program 113 does not provide any notification.

Figure 6:
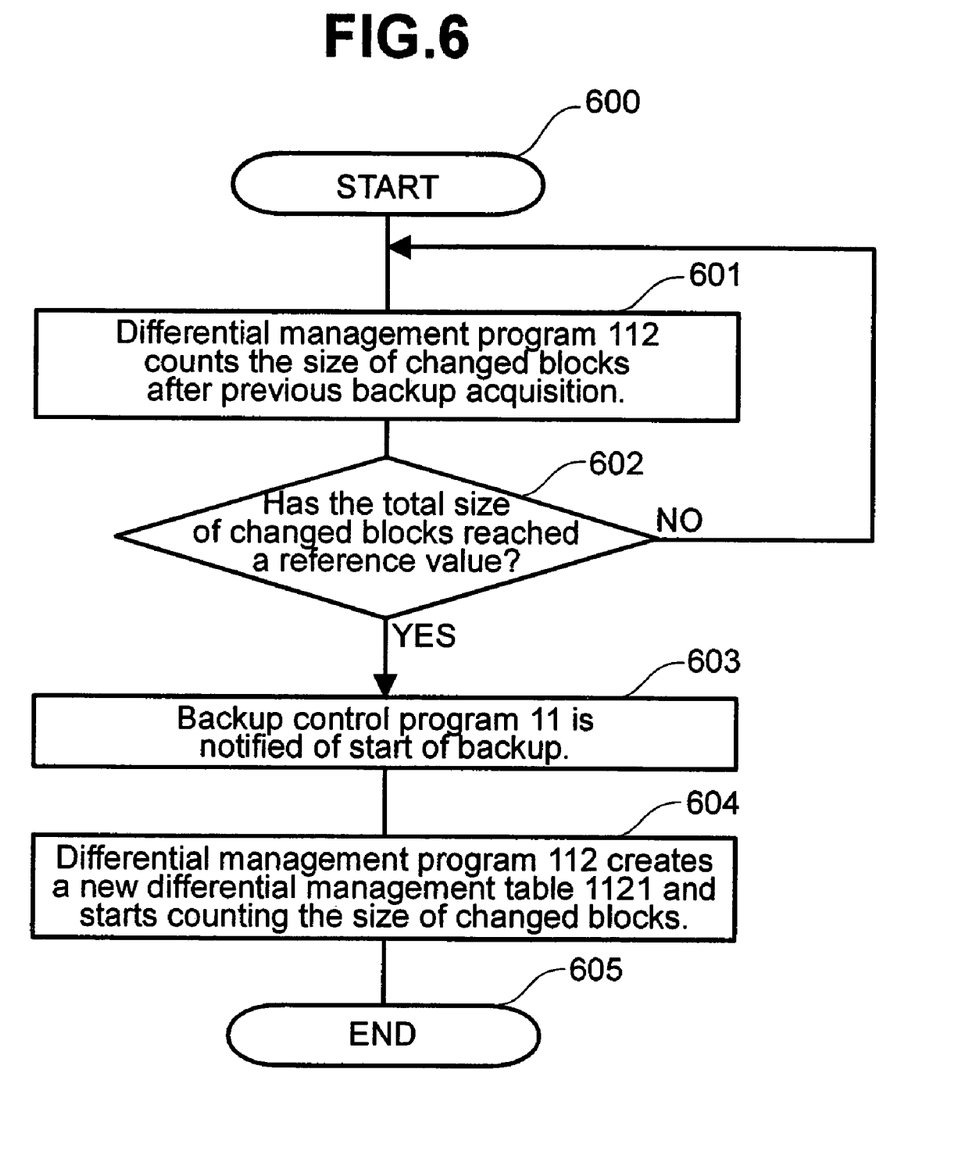
FIG. 6 is a flowchart which shows a process to determine the time to start backup when the total size of changed blocks is specified as a recovery point object according to the first embodiment.

Next, referring to FIG. 6, an explanation will be given concerning how a backup process starts when a Total Size of Changed Blocks is specified as the Recovery Point Object. The differential management program 112 always counts the number of blocks which have changed after the previous backup acquisition, using the differential management table 1121 (step 601). The differential management program 112 compares the count (total size) of changed blocks with the reference value entered for Total Size of Changed Blocks as the recovery point object. If the count is below the reference value, the system goes back to step 601 (step 602).

When the count reaches the reference value, the backup control program 11 is notified of the start of the backup process. The content of the volume at this time is backed up (step 603). The differential management program 112 creates a new differential management table 1121 for the next backup and starts counting the size of the changed blocks. The above process is repeated (step 604).

If the total size of the changed blocks exceeds the free area in the storage pool for backup data 13 while counting is under way, the management program 21 is notified thereof so as to urge addition of a disk to the storage pool for backup data 13. If no recovery point object is specified, the time period entered for the Recovery Time Object is used to calculate the total size of the changed blocks which can be restored within that time period, and the result of calculation is used as a reference value.

In this way, the differential management program 112 monitors the total size of changed blocks all of the time and indicates the time to start backup.

Figure 7:
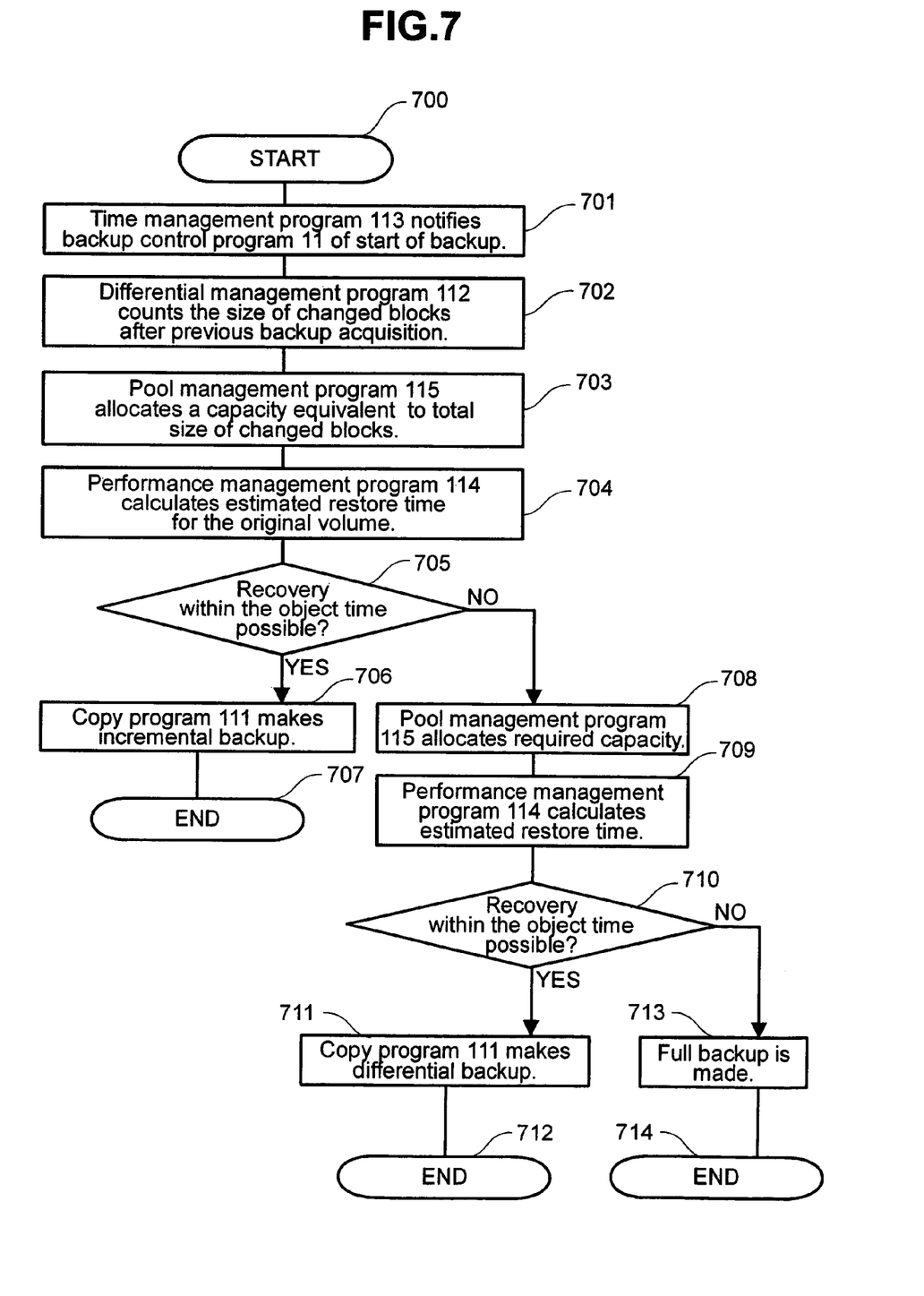
FIG. 7 is a flowchart which shows a backup process according to the first embodiment.

Next, referring to the flowchart in FIG. 7, how backup is performed will be explained. The time management program 113 notifies the backup control program 11 of the start of backup according to the specified time information (step 701).

As the backup control program 11 receives the notification of start of backup, it asks the differential management program 112 for the size of the changed blocks, and the differential management program 112 counts the size of changed blocks after the previous backup acquisition, the size of the changed blocks as a difference from a full backup as a base, and the cumulative total size of the changed blocks, after full backup, using the differential management table 1121. Meanwhile, the differential management program 112 creates a new differential management table 1121 to prepare for a next backup (step 702).

When the Total Size of Changed Blocks is specified as the Recovery Point Object, the differential management program 112 already knows the time of start of backup and the total size of the changed blocks is constant, so steps 701 and 702 are omitted.

Next, the pool management program 115 allocates an area equivalent to the current size of the changed blocks to the storage pool for backup data 13. The disk information of the allocated area is given to the performance management program 114. If the acquired backup of the original volume 12 is more than a predetermined number of generations of backup, the pool management program 115 invalidates the oldest generation of backup and makes the area so far occupied by it free. If the free area in the storage pool for backup data 13 is insufficient and an enough area cannot be allocated, the pool management program 115 notifies the management program 21 thereof (step 703).

The performance management program 114 reads the write performance of the last acquired full backup volume and the read performance of the allocated area from the performance management table 1141 and takes the lower performance as the estimated performance for restoration of data. The estimated restore time for incremental backup is calculated by dividing the cumulative total size of changed blocks counted after full backup by the estimated restore performance. For example, if the cumulative total size of changed blocks is 600 GB and the estimated restore performance is 100 MB/s in a high speed volume, the estimated restore time is 100 minutes; while, if the estimated restore performance is 20 MB/s in a low speed volume, the estimated restore time is 500 minutes (step 704).

A decision is made as to whether the estimated restore time thus calculated is within the specified Recovery Time Object time (step 705).

If recovery can be done within the specified object time, the copy program 111 copies the changed part of the original volume 12 to the abovementioned area allocated by the pool management program 115 to acquire an incremental backup. Even when there is a change in the copy source area during backup, the update data is received after copying of the source area so that data coherence is assured and access to the original volume 12 can be continued (step 706).

If it is decided that recovery within the specified object time is impossible, the pool management program 115 reallocates an area required for differential backup according to the total size of changed blocks counted as a difference from full backup as a base. If the storage pool for backup data 13 contains a volume whose speed is higher than the speed of the area allocated at step 703, the pool management program 115 can go back to step 703 in order to reallocate an area of the higher speed volume for incremental backup (step 708).

As at step 704, the performance management program 114 reads the write performance of the last acquired full backup volume and the read performance of the area allocated for differential backup from the performance management table 1141 and takes the lower performance as the estimated performance for restoration of data. The estimated restore time for differential backup is calculated by dividing the total size of changed blocks counted as a difference from full backup as a base by the estimated restore performance (step 709).

A decision is made as to whether the estimated restore time for differential backup thus calculated is within the time specified as the Recovery Time Object (step 710).

If recovery can be done within the specified object time, the copy program 111 copies the changed part as a difference from full backup as a base (indicated by the differential management program 112) to the abovementioned area allocated by the pool management program 115 to acquire a differential backup (step 711).

If it is decided that recovery within the specified object time is impossible, a full backup is made so that data can be restored simply by changing the volume. If the storage pool for backup data 13 contains a volume whose speed is higher than the speed of the area allocated at step 708, the pool management program 115 can go back to step 708 in order to reallocate an area of the higher speed volume for differential backup.

A full backup is acquired by splitting previously made duplicates of the original volume for backup 12. Also, as a preparation for a next full backup, the pool management program 115 can prepare a new area and the copy program 111 starts making an initial copy of the volume to duplicate the volume. If the volume has not been duplicated, the pool management program 115 allocates an area for a full backup and the copy program 111 makes a full backup in the allocated area. In this process, for the purpose of minimizing the burden on the original volume for backup 12, at first, only the changed part is copied from the original volume 12, and then required data in the rest of the data (unchanged data) is copied from the previous full backup volume or the differential backup area (step 713). In this way, the backup method is automatically determined and executed depending on the total size of the changed blocks.

As explained above, according to the first embodiment, high speed backup from a disk device to another storage device is possible. Because the user can specify the Recovery Point Object and the Recovery Time Object, backup acquisition can be done in a practical manner. Volume configuration, performance management, and management of the total size of the changed blocks are performed automatically inside the storage system, thereby minimizing the burden on the user.

Embodiment 2

Figure 8:
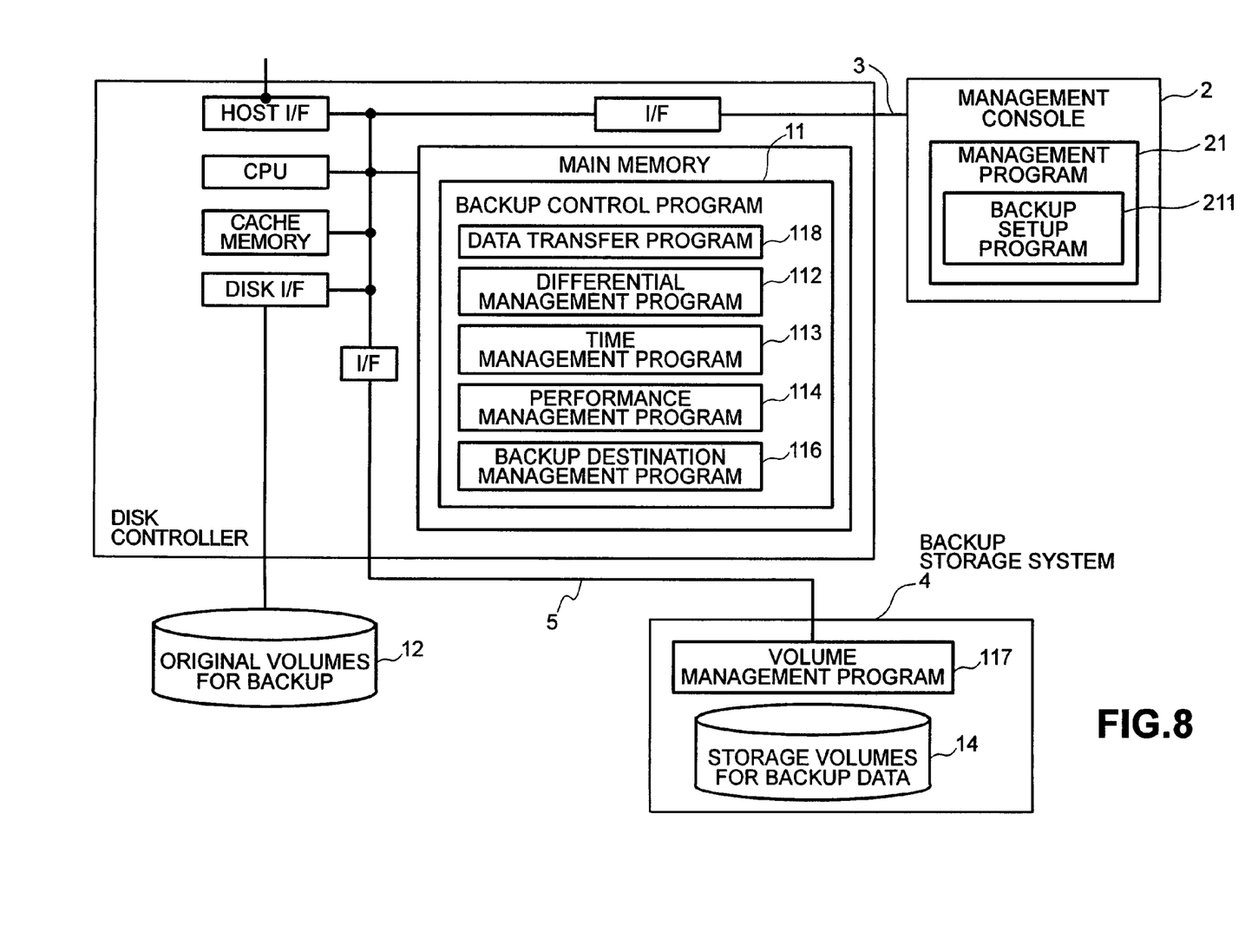
FIG. 8 is a block diagram which shows a storage system and a management console according to a second embodiment of the present invention.

FIG. 8 shows a system configuration according to a second embodiment. This embodiment is different from the first embodiment in that a data transfer program 118 for data transfer between storage systems is incorporated in the storage system 1 in place of the copy program, and a backup destination management program 116 for management of backup storage system volumes is provided in place of the pool management program 115. In the second embodiment, a backup storage system 4, which is remote from the storage system 1, is connected to the disk controller through a data transfer line 5.

The data transfer line 5, which connects the storage system 1 and the backup storage system 4, may be a Fiber Optic Channel, SCSI, Ethernet (registered mark), or Infiniband cable. For the purpose of redundancy, a plurality of transfer lines may be connected, or a hub, switch, router, or protocol converter may be used. In short, any connection method or protocol may be used.

The backup storage system 4 incorporates a storage volume for backup data 14, which stores backup data, and a volume management program 117, which manages volumes in the backup storage system 4.

Although the performance management program 114 resides in the storage system 1 in the second embodiment, it may instead reside in the backup storage system 4. If that is the case, the performance management program 114 in the backup storage system 4 manages the performance of the storage volume for backup data 14 and notifies the backup control program 11 in the storage system 1 of such management. Alternatively, a system which functions in the same way as the storage system 1 may be used as a backup storage system 4 and may be linked with the storage system 1.

Figure 9:
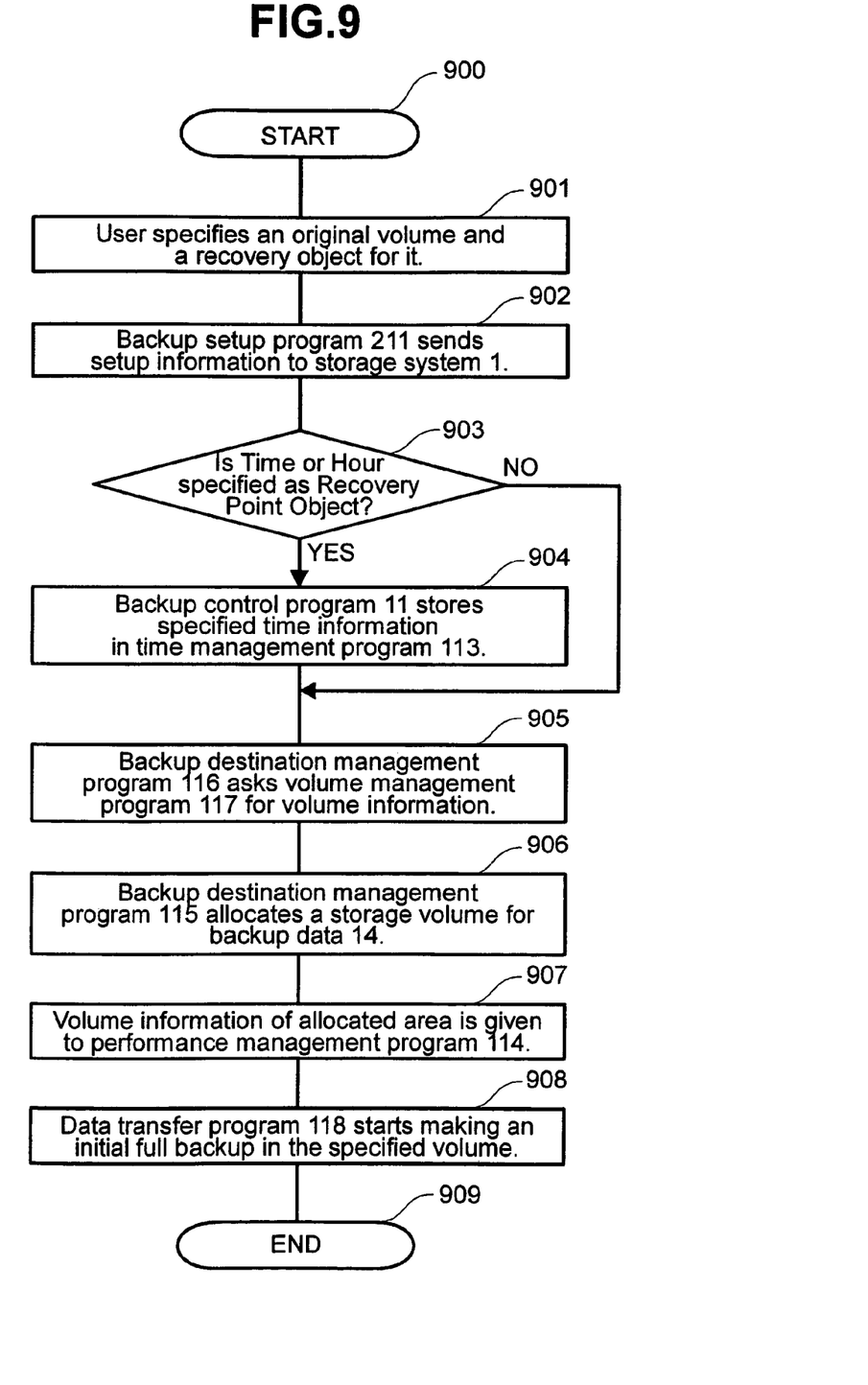
FIG. 9 is a flowchart which shows a backup initial setup process according to the second embodiment.

FIG. 9 is a flowchart showing the backup initial setup process according to the second embodiment. First, the user specifies an original volume for backup and a recovery object for it. As the recovery object, either the Recovery Point Object or the Recovery Time Object, or both, should be specified as in the first embodiment. Even when plural backup storage systems 4 are connected, a specific system among them can be identified by registering the ID of each backup storage system 4 (step 901). Steps 902 to 904 are the same as in the first embodiment, and so descriptions of these steps are omitted here.

Then, the backup destination management program 116 asks the volume management program 117 for volume information. The backup destination management program 116 notifies the volume management program 117 of the capacity required for a full backup, and the volume management program 117 creates a LU (logical unit) with the required capacity. This eliminates the possibility of a volume capacity mismatch which could make a volume area useless. The volume management program 117 gives information on the created LU and other available LU5 or disks. This information includes LUN (Logical Unit No.) for volume identification, disk type and RAID configuration and is used for allocation of a required area or calculation of a restore performance. If the backup storage system 4 has a performance monitoring function, the volume performance information may be sent directly (step 905).

The backup destination management program 116 manages the received volume information and selects one from among the volumes to allocate it as a storage volume for backup data 14 for an initial full backup (step 906). Volume information, such as the RAID configuration and disk type of the allocated area, is given to the performance management program 114. The performance management program 114 writes the information in the performance management table 1141 to manage the performance of the allocated volume (step 907).

The data transfer program 118 makes an initial full backup copy in the specified volume. As in the first embodiment, a full backup is achieved by duplicating the volume during the initial copying beforehand and the splitting the two volumes at a certain time point thereafter. The method of full backup acquisition is not limited thereto (step 908).

Initial setup is completed in this way, and a first generation of full backup as a base is acquired. As in the first embodiment, when the first generation of full backup is acquired, the volume may be duplicated between storage systems to prepare for the next full backup. It is also possible to make three or more copies of the volume when the first generation of full backup is acquired.

Figure 10:
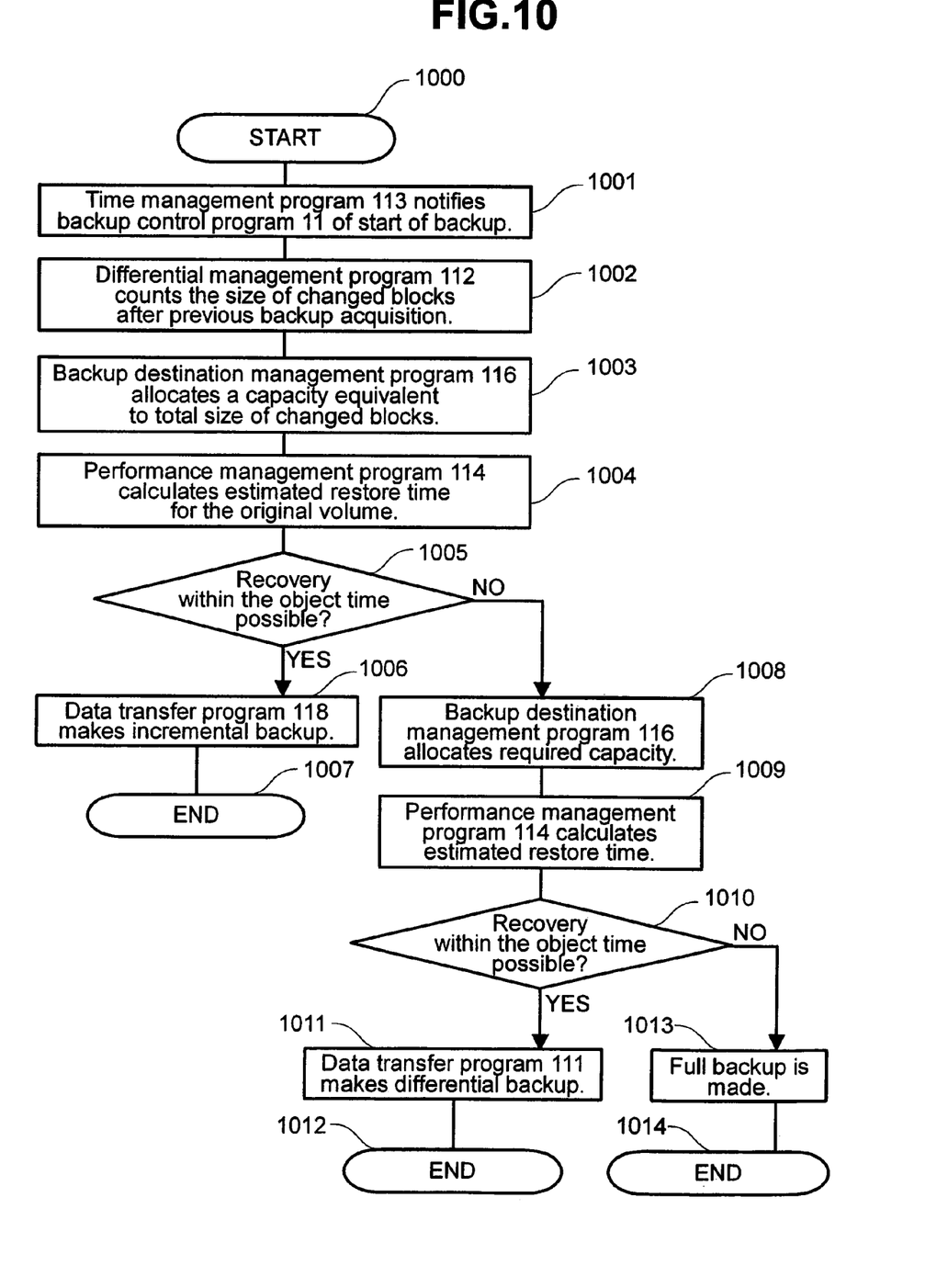
FIG. 10 is a flowchart which shows a backup process according to the second embodiment.

Next, referring to the flowchart in FIG. 10, an explanation will be given concerning how a backup copy is made. Steps 1001 and 1002 are the same as in the first embodiment, and so their descriptions are omitted here. In the second embodiment, when the Total Size of Changed Blocks is specified as the Recovery Point Object, the steps 1001 and 1002 can be omitted as in the first embodiment.

Next, according to the volume information given for initial setup, the backup destination management program 116 allocates an area (among the available areas) equivalent to the count of the present changed blocks. If the acquired backup of the original volume 12 is more than a predetermined number of generations of backup, the backup destination management program 116 invalidates the oldest generation of backup and makes the area so far occupied by it available for a subsequent backup. If the free area in the storage volume for backup data 14 is insufficient and an enough area cannot be allocated, the backup destination management program 116 notifies the management program 21 thereof (step 1003).

As in the first embodiment, the performance management program 114 reads the write performance of the last acquired full backup volume and the read performance of the area allocated for differential backup and takes the lower performance as the estimated performance for restoration of data. The estimated restore time for incremental backup is calculated by dividing the cumulative total size of the changed blocks counted after full backup by the estimated performance (step 1004).

A decision is made as to whether the estimated restore time thus calculated is within the specified Recovery Time Object time (step 1005). If recovery can be completed within the specified object time, the data transfer program 118 transfers the changed part of the original volume 12 to the abovementioned area allocated by the backup destination management program 116 to acquire an incremental backup. As in the first embodiment, even when there is a change in the copy source area during backup, the update data is received after transfer of the source area to the backup storage system 4, and access to the original volume 12 can be continued (step 1006).

If it is decided that recovery within the specified object time is impossible, the backup destination management program 116 reallocates an area required for differential backup according to the total size of the changed blocks counted as a difference from full backup as a base. As in the first embodiment, if the storage volume for backup data 14 contains a volume whose speed is higher than the speed of the area allocated at step 1003, the backup destination management program 116 can go back to step 1003 in order to reallocate an area of the higher speed volume for incremental backup (step 1008).

As at step 1004, the performance management program 114 reads the write performance of the last acquired full backup volume and the read performance of the area allocated for differential backup from the performance management table 1141 and takes the lower performance as the estimated performance for restoration of data. The estimated restore time for differential backup is calculated by dividing the total size of the changed blocks counted as a difference from full backup by the estimated restore performance (step 1009). A decision is made as to whether the estimated restore time thus calculated for differential backup is within the time specified as the Recovery Time Object (step 1010).

If recovery can be completed within the specified object time, the data transfer program 118 transfers the changed part as a difference from full backup as a base (indicated by the differential management program 112) to the abovementioned area allocated by the backup destination management program 116 to acquire a differential backup (step 1011).

If it is decided that recovery within the specified object time is impossible, a full backup is made so that data can be restored simply by changing the volume. As in the first embodiment, if the storage pool for backup data 14 contains a volume whose speed is higher than the speed of the area allocated at step 1008, the backup destination management program 116 can go back to step 1008 in order to reallocate an area of the higher speed volume for differential backup.

As in the first embodiment, a full backup is achieved by splitting previously made duplicates of the original volume for backup 12. Also, as a preparation for a next full backup, the backup destination management program 116 can prepare a new area and the data transfer program 118 start initial copying of the volume between storage systems to duplicate the volume. If the volume has not been duplicated, the backup destination management program 116 allocates an area for a full backup and the data transfer program 118 transfers data for a full backup to the allocated area to acquire a full backup.

When the backup storage system 4 has a copy program, it is possible that the data transfer program 118 will transfer only the changed part, and the required data in the rest of the data (unchanged data) is copied from the previous full backup volume or the differential backup area as in the first embodiment (step 1013).

Thus, when the backup destination management program 116 receives information on the storage volume for backup data 14 from the volume management program 117 in the backup storage system 4, it determines where to store the backup data.

As explained above, the second embodiment not only achieves the effects of the first embodiment, but also allows acquisition of a backup even when the backup storage system 4 is in a remote location so that even if the entire storage system 1 breaks down due to a disaster or accident, a backup stored in the remote location, can be used to restore data.

Embodiment 3

Figure 11:
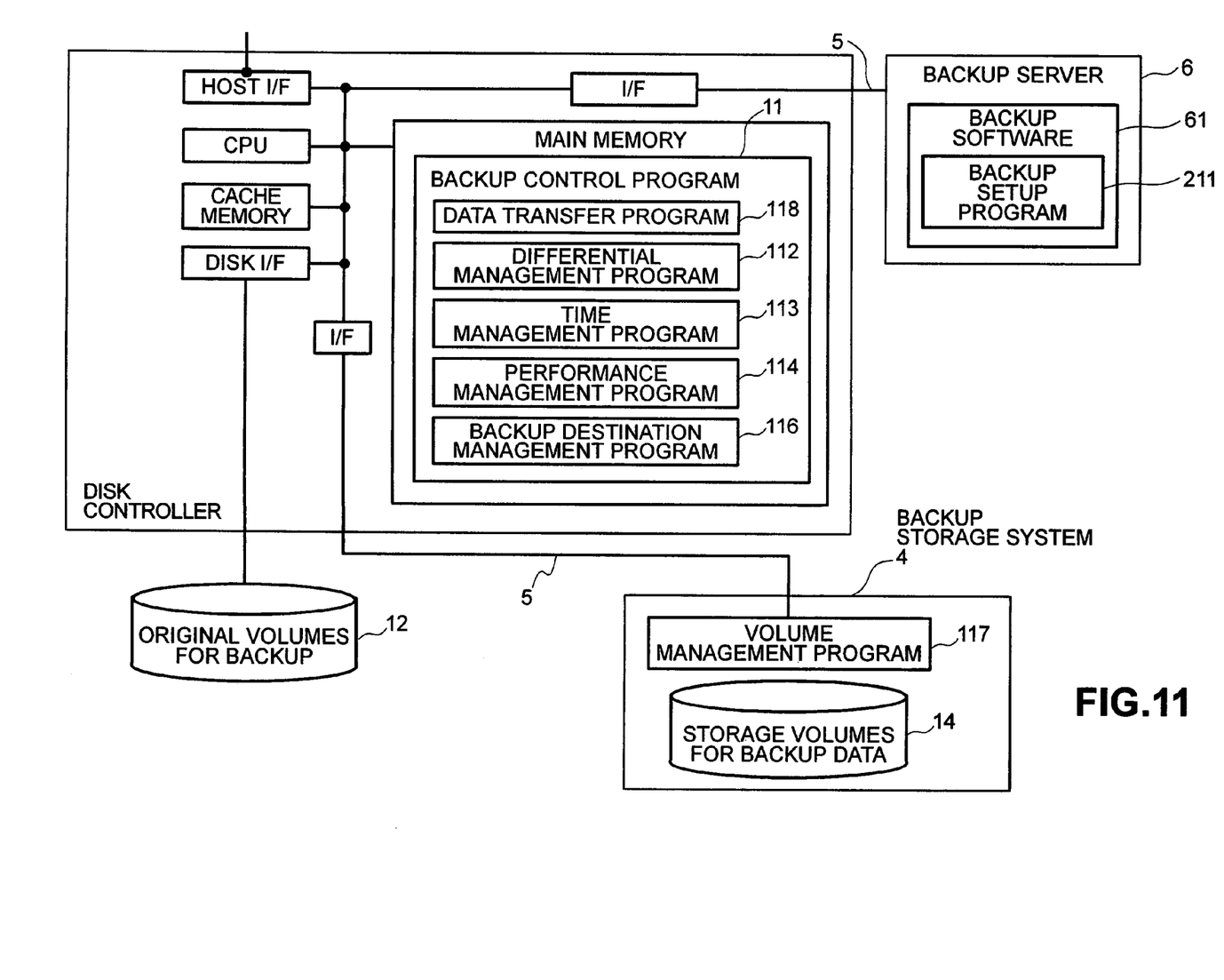
FIG. 11 is a block diagram which shows a storage system and a backup server according to a third embodiment of the present invention.

FIG. 11 shows the system configuration according to a third embodiment. This embodiment is different from the second embodiment in that a backup server 6 is connected with the storage system 1 in place of the management console 2.

The backup server 6 incorporates backup software 61, which manages backups on a file-by-file basis, and a backup setup program 211. Although the storage system 1 and the backup storage system 4 are separate in the third embodiment, the storage pool for backup data 13 may be incorporated in the storage system 1 as in the first embodiment.

While only the storage system is used to perform backup and, therefore, acquisition of a backup is done on a volume-by-volume basis in the first and second embodiments, the backup server 6 enables the backup setup program 211 and the backup software 61 to operate in conjunction with each other and makes it possible to acquire a backup on a file-by-file basis in the third embodiment.

Under the backup software 61, files or directories are grouped and a recovery object is specified for each file group. A recovery object can be specified using the backup setup program 211 in the same way as shown in FIG. 2. The backup setup program 211 gives information on recovery object setting and files (file structure and location) for each file group to the storage system 1.

Figure 12:
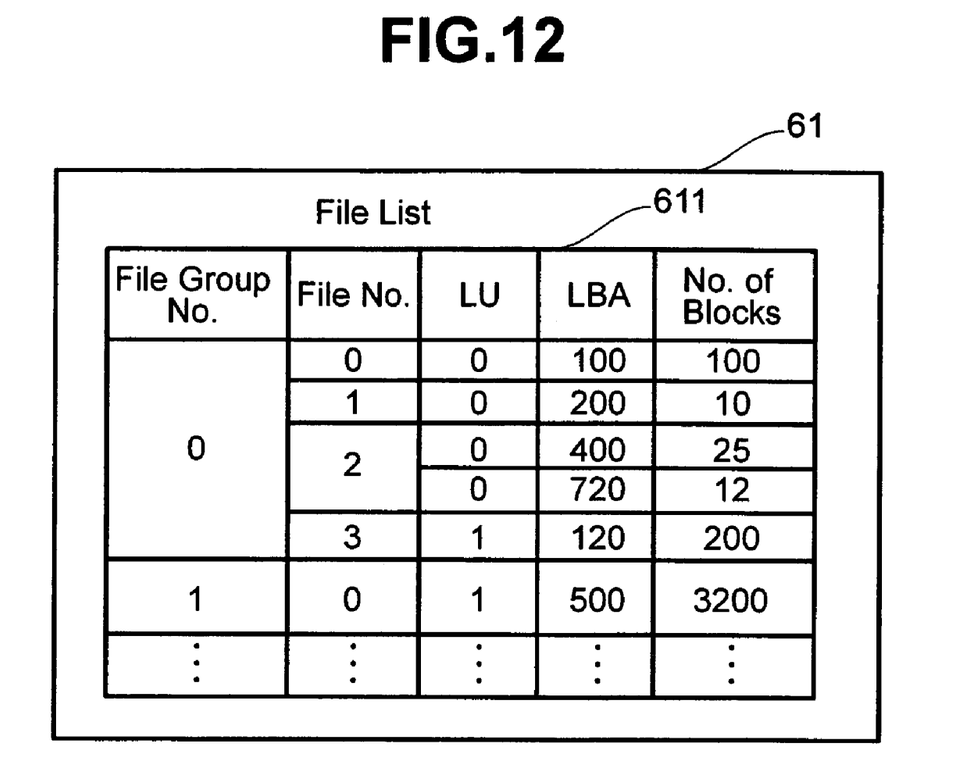
FIG. 12 is a diagram which shows an example of file information under a backup software in the backup server connected with the storage system according to the third embodiment.

FIG. 12 shows an example of the file information. The backup software 61 creates a file list 611 for management of file groups. The file list 611 contains file group numbers for file group identification and file numbers for file identification. For each file, the file list 611 also contains a LU (Logical Unit) and a LBA (Logical Block Address) as an address in the storage system 1, as well as the number of blocks as a data size. The backup setup program 211 transfers the file list 611 to the storage system 1 to notify the storage system 1 of the location and size of the source file.

The storage system 1 creates a differential management table 1121 for each file group according to the received file information and performs differential management in order to acquire a backup on a file-by-file basis. The backup process is the same as in the first and second embodiments.

In this way, the backup setup program 211 and the backup software 61 work together to give file information to the storage system 1, thereby permitting a backup to be acquired on a file-by-file basis.

As explained above, embodiments of the present invention are characterized in that a storage system incorporates a backup control program which carries out total backup control by selecting and executing a backup method according to given information, and a backup setup program is incorporated in a management console which manages the storage system. Specifically, the backup control program has a differential management program which checks whether an original volume for backup is updated or not, a pool management program which manages a disk area to store backup data, and a performance management program which manages the performance of volumes in the storage system; and the backup setup program has an interface with which the user can specify a recovery object and acquire a backup by simple setup work.

According to the recovery object specified by the backup setup program, the backup control program selects the most suitable backup method. The differential management program manages the total size of changed blocks at the time of backup acquisition and the pool management program allocates a required disk area. The performance management program calculates the performance for restoration of an original volume for backup and the backup control program selects a backup method which allows restoration to be done within a specified recovery time, according to the calculated restore performance and total size of the changed blocks.

Volume configuration, performance management, and management of the total size of the changed blocks are performed automatically inside the storage system so that backup acquisition from one disk device to another is optimized, thereby reducing the burden on the user.

The present invention produces an effect that high-speed backup between disk devices is possible. Since the storage system plays a main role in backup acquisition, a backup is acquired regardless of the type or version of OS in use.

The user can acquire a backup simply by specifying a recovery object.

Since management which is necessary for backup acquisition is automatically carried out inside the storage system, a backup is acquired in an optimized manner, leading to reduction in the burden on the user.

What is claimed is:

1. A backup method for a storage system, wherein said storage system comprises a disk controller, an original volume storing data to be backed up, and a storage pool including storage areas to be used for storing backup data, comprising the steps of:
   setting a target recovery time and a target recovery point from a management console to said storage system;
   preparing a backup volume from storage areas in said storage pool;
   executing initial full backup copy from said original volume to the prepared backup volume;
   when a condition specified by said target recovery point is satisfied, calculating estimated restore time to restore data in said original volume from backup data for each of plural backup methods;
   selecting one backup method from said plural backup methods, said target recovery time is satisfied by using the selected backup method; and
   executing backup copy according to said selected backup method,
   wherein said storage system maintains a performance management table which is used to manage disk and volume performance and calculate the restore time,
   wherein the performance management table includes for each volume at least a Redundant Array of Inexpensive Disks (RAID) configuration which constitute said volume, information indicating a read performance of said volume, and information indicating a write performance of said volume, and
   wherein the restore time is calculated based on at least the RAID configuration, read performance and write performance of each volume.

2. A backup method according to claim 1, wherein one of said plural backup methods is a full backup method in which data stored in said original volume is backed up, another one of said plural backup methods is a differential backup method in which data updated after the latest full backup operation is backed up, and another one of said plural backup methods is an incremental backup method in which data updated after the latest backup operation is backed up.

3. A backup method according to claim 2, wherein in said selecting step, if the estimated restore time of said incremental backup method satisfies said target recovery time, said incremental backup method is selected.

4. A backup method according to claim 1, wherein in said calculating step, read performance of a storage area to be used for backup data or write performance of a backup volume already storing backup data is used to estimate a restore time.

5. A backup method according to claim 1, wherein in said calculating step, an amount of updated data is used to estimate a restore time.

6. A backup method for a storage system, wherein said storage system comprises a disk controller, an original volume storing data to be backed up, and a storage pool including storage areas to be used for storing backup data, comprising the steps of:

setting a target recovery time and a target recovery point from management console to said storage system;

preparing a backup volume from storage areas in said storage pool;

executing initial full backup copy from said original volume to the prepared backup volume;

when a condition specified by said target recovery point is satisfied, calculating estimated restore time to restore data in said original volume from backup data for each of plural backup methods;

selecting one backup method from said plural backup methods, said target recovery time is satisfied by using the selected backup method; and executing backup copy according to said selected backup method, wherein one of said plural backup methods is a full backup method in which data stored in said original volume is backed up, another one of said plural backup methods is a differential backup method in which data updated after the latest full backup operation is backed up, and another one of said plural backup methods is an incremental backup method in which data updated after the latest backup operation is backed up, wherein in said selecting step, if the estimated restore time of said incremental backup method satisfies said target recovery time, said incremental backup method is selected, and wherein in said selecting step, if the estimated restore time of said incremental backup method does not satisfy said target recovery time, and the estimated restore time of said differential backup method satisfies said target recovery time, said differential backup method is selected.

7. A backup method according to claim 6, wherein in said selecting step, if the estimated restore times of both said incremental backup method and said differential backup method do not satisfy said target recovery time, said full backup method is selected.

* * * * *